(No Model.) 6 Sheets—Sheet 1.

G. F. NEWELL.
MACHINE FOR COVERING WEBBING FOR BOOT STRAPS.

No. 307,674. Patented Nov. 4, 1884.

WITNESSES
Jas. P. Livermore
J. H. Smith

INVENTOR
George F. Newell
by Crosby & Gregory
Attys

N. PETERS. Photo-Lithographer, Washington, D. C.

(No Model.) 6 Sheets—Sheet 3.
G. F. NEWELL.
MACHINE FOR COVERING WEBBING FOR BOOT STRAPS.
No. 307,674. Patented Nov. 4, 1884.

WITNESSES
Jos. P. Livermore
J. H. Smith

INVENTOR
George F. Newell
by Crosby Gregory
Attys

(No Model.) 6 Sheets—Sheet 4.
G. F. NEWELL.
MACHINE FOR COVERING WEBBING FOR BOOT STRAPS.
No. 307,674. Patented Nov. 4, 1884.

(No Model.)

G. F. NEWELL.
MACHINE FOR COVERING WEBBING FOR BOOT STRAPS.

No. 307,674. Patented Nov. 4, 1884.

(No Model.)

G. F. NEWELL.
MACHINE FOR COVERING WEBBING FOR BOOT STRAPS.

No. 307,674. Patented Nov. 4, 1884.

Witnesses.
Jos. P. Livermore
J. H. Smith

Inventor:
George F. Newell
by Crosby & Gregory
Attys

UNITED STATES PATENT OFFICE.

GEORGE F. NEWELL, OF WEST NEWTON, MASSACHUSETTS.

MACHINE FOR COVERING WEBBING FOR BOOT-STRAPS.

SPECIFICATION forming part of Letters Patent No. 307,674, dated November 4, 1884.

Application filed August 12, 1884. (No model.)

*To all whom it may concern:*

Be it known that I, GEORGE F. NEWELL, of West Newton, county of Middlesex, State of Massachusetts, have invented an Improvement in Machines for Covering Webbing for Boot-Straps, of which the following description, in connection with the accompanying drawings, is a specification, like letters on the drawings representing like parts.

This invention relates to machines for covering webbing for boot-straps.

Heretofore machines of the class mentioned have been constructed in which a continuous ribbon of webbing was covered with a tube or covering of paper, and the webbing so covered was then automatically cut into pieces suitable for straps of the desired length, whereupon the paper tube or covering was perforated or slitted transversely at points between those portions or ends of the boot-strap which are usually fastened or stitched to the boot or shoe, and the loop or central exposed portion and the tubing covering such ends or first-mentioned portions were stripped from the webbing, thus leaving the loop or exposed portion only covered and protected by the paper covering. In this my invention the webbing is automatically fed from one end of the machine into a suitable tube arranged above a table, and then cut into pieces suitable for straps of the desired length. About the same time a ribbon or sheet of paper from the paper roll, which is of a width equal to the length of that portion of the length of webbing which it is desired to cover—namely, the central or what forms the loop or exposed portion of the strap when attached to a boot—is fed from one side of the machine across the table and below the tube containing the piece of webbing, when a paste-roll applies paste to one edge or side of the paper as the latter is cut into a proper length. The strip of webbing and the piece of paper are seized between a forwarding roll and belt and projected through a folder having a flaring mouth, which causes the paper to be folded or lapped over onto the central portion of webbing, and is then passed under a pressure-roll and pasted. The webbing, with its central portion covered by the paper tube, is then fed over a pair of rolls and forced or doubled between them by means of a plunger, which thereby folds the length of webbing in its center, when the said folded webbing or finished boot-strap is delivered from the machine and may be dropped into a suitable receptacle. By this means there is no waste of paper after the webbing has been covered, nor is there any ragged or torn edges of the paper covering; but, on the contrary, the boot-strap is delivered from the machine in perfect condition with only that portion thereof which forms the loop or exposed portion after the strap is attached to a boot covered and protected by a paper tube.

The nature of the invention is fully disclosed in the following description, and is particularly pointed out in the claims.

The frame-work A of the machine, of suitable size, shape, and construction to support the operating mechanism, rests upon a bed, B, supported on legs B'. The main or driven shaft $a$, bearing in the upper part of the frame A, has a pulley, $a'$, fly-wheel $a^2$, and a spur-gear, $a^3$, which last conveys motion through the gear-wheel $a^4$, secured to shaft $a^7$, held in bearings on the frame, to the gear $a^5$, attached to one end of the webbing-feed shaft $a^6$, which in turn is held in bearings fastened to the frame A. A partial roll, 2, arranged above the table 1, and having a circumferentially-grooved face, co-operates with the full-faced circumferentially-grooved feed-roll 3, suitably held in bearings immediately below said table 1, to feed to the cutters or knives the webbing, which is drawn from a suitable reel, 4, attached to brackets placed in the frame-work in such position that the said webbing may be passed between suitable guide-rolls, $x'$, thence onto the table 1, and into the tube 5, which, with the table 1, is provided with slots 6, to permit the grooved faces of the rolls 2 and 3 to intermittently grasp and feed the webbing past the knives $b$ and into the webbing-tube 7, (see Figs. 6 and 8,) when said knives operate to cut the webbing into suitable lengths, as it is thus intermittently fed into said tube.

Figures 1, 2:
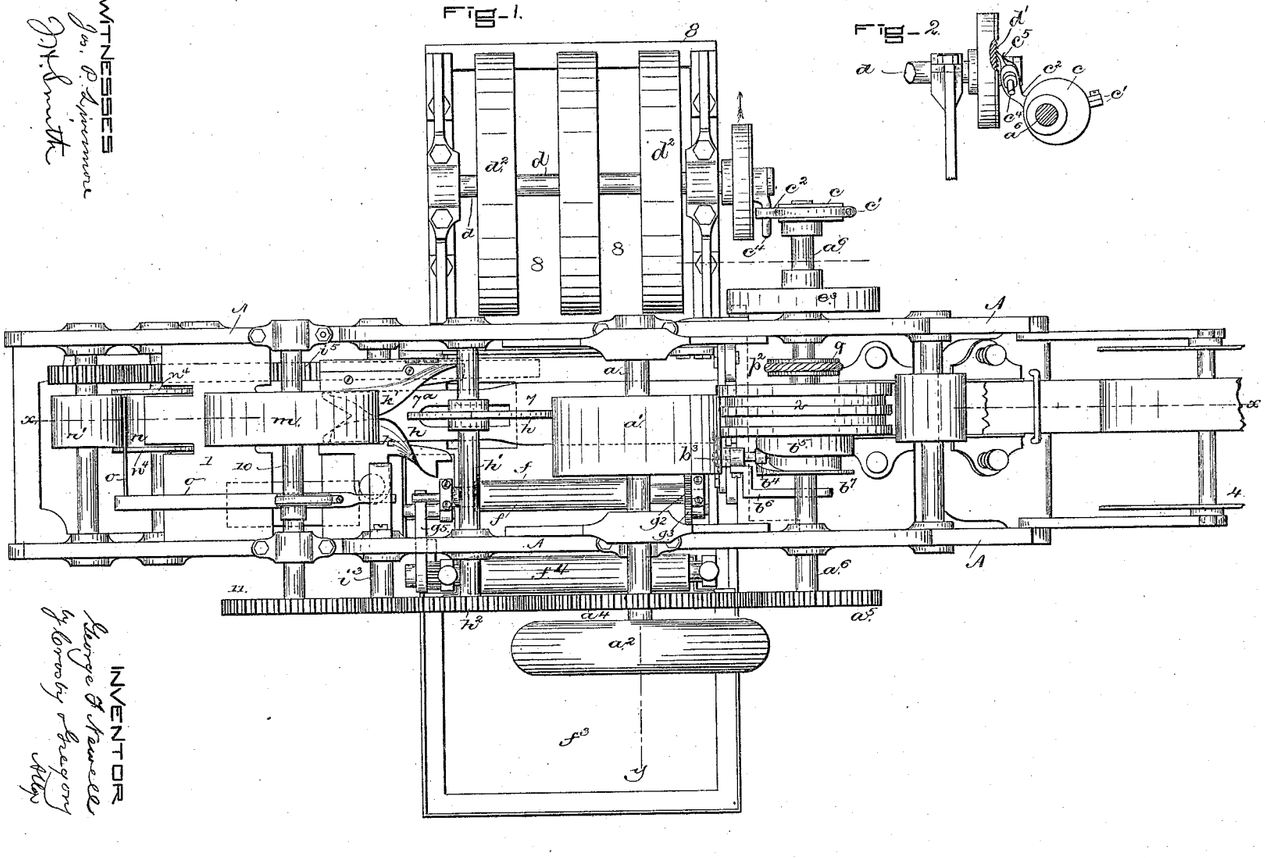
Figure 1 is a plan view of a machine for covering webbing for boot-straps as embodying my invention.
Fig. 2, a detail view of the connection between the webbing and paper feeding shafts, to convey intermittent motion from the former to the latter.
Figure 3:
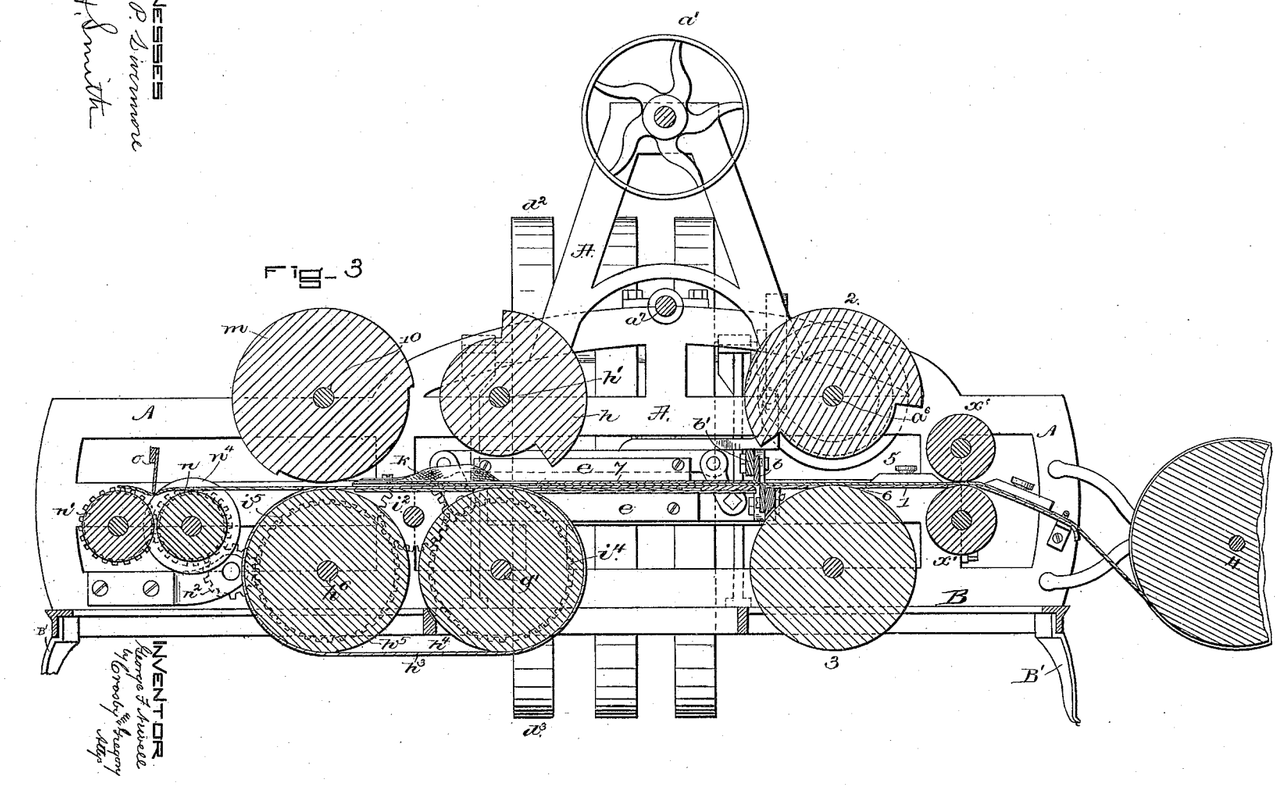
Fig. 3, a longitudinal vertical section on line $x\,x$ of Fig. 1.
Figure 4:
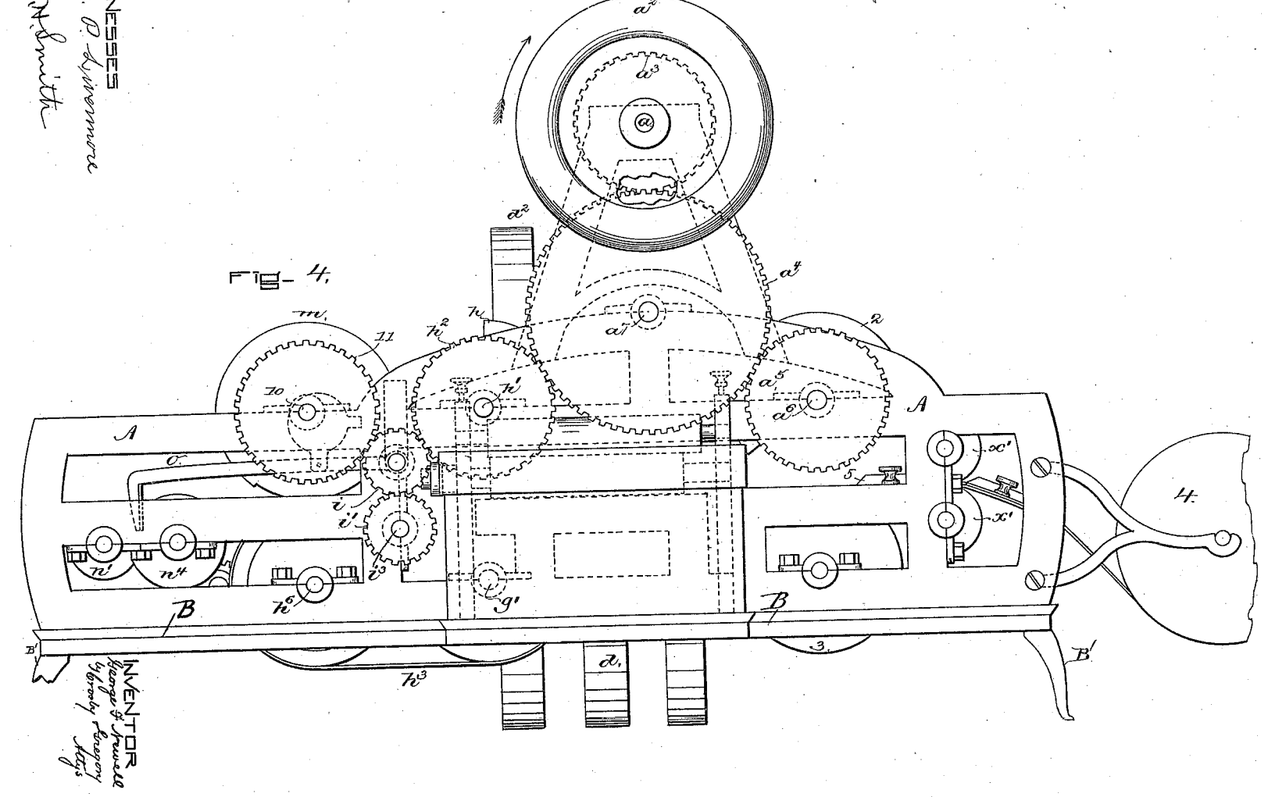
Fig. 4, a side elevation showing the arrangement of the principal gear-wheels.
Figures 5, 6, 7, 8:
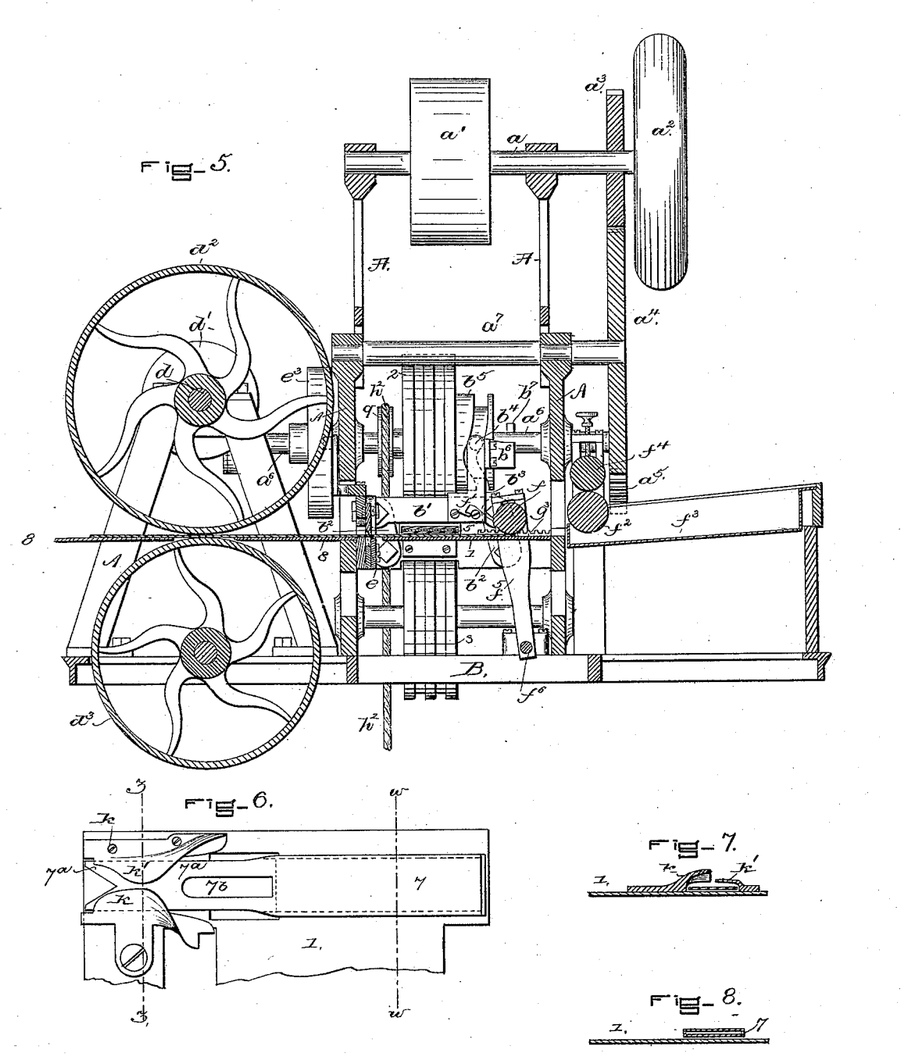
Fig. 5, a transverse vertical section on line $y\,y$, Fig. 1.
Fig. 6, a detail view of the folder for folding the paper about the webbing.
Fig. 7, a cross-section on line $z\,z$, Fig. 6.
Fig. 8, a similar section on line $w\,w$, Fig. 6, to show the webbing-tube and its arrangements with reference to the table which receives the cut strips of covering-paper.
Figure 9:
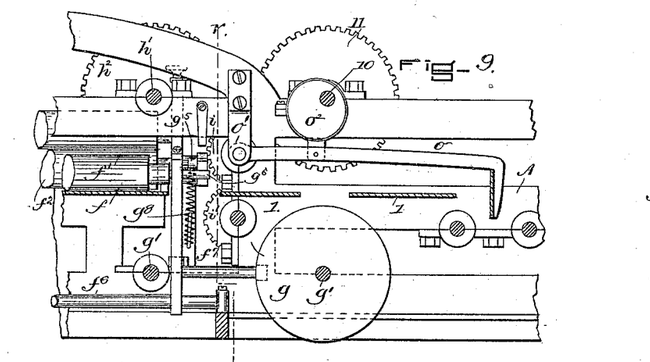
Fig. 9, a longitudinal vertical section of part of the machine, to more clearly show the arrangement of the plunger which folds or doubles the webbing and its covering, and the connection of said plunger with contiguous mechanism.
Figure 10:
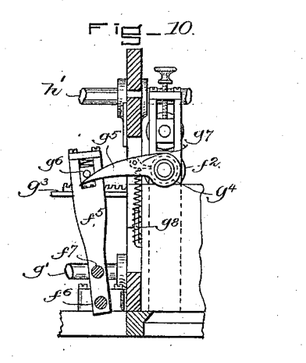
Fig. 10, a transverse vertical section on line $v\,v$, Fig. 9.
Figure 11:
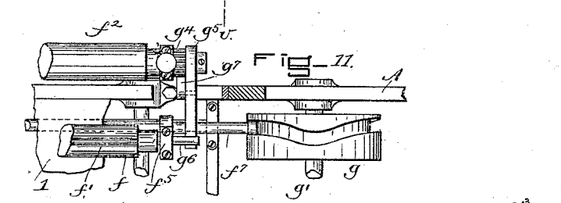
Fig. 11, a detail view showing the cam-wheel and arm which operates the rock-standards that support the pasting-roll.
Figure 12:
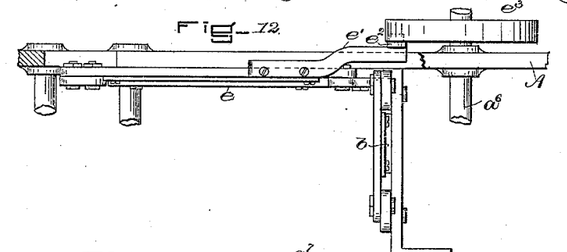
Fig. 12, a detail plan of the paper-cutting knives and the cam-wheel which operates the upper knife.
Figure 13:
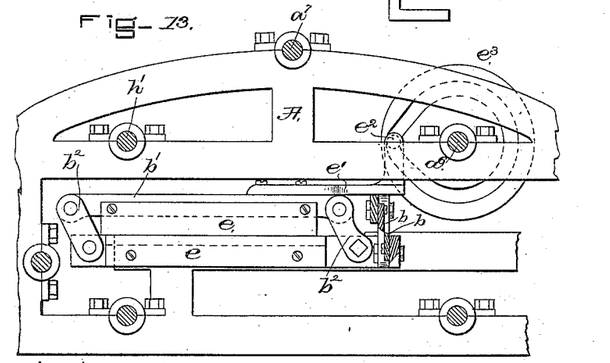
Fig. 13 is a detail side elevation thereof.
Figure 14:
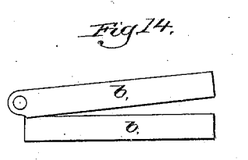
Fig. 14, an elevation of the knife-blades, to more clearly show the form of the upper or movable blade.
Figure 15:
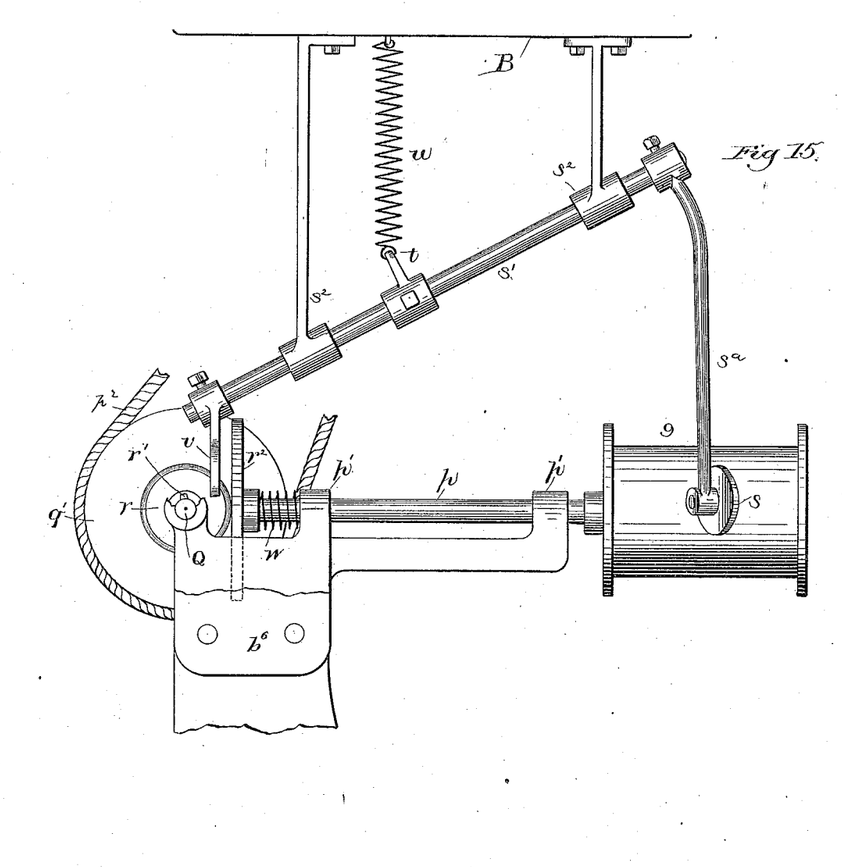
Fig. 15, a detail of the shaft carrying the paper roll and the mechanism for automatically regulating the speed of said roll-shaft.

The knives $b$ (see Figs. 3 and 5) consist of a lower stationary knife fixed to a cross-piece of the frame A and an upper or movable knife attached to a knife-plate, $b'$, which is connected by the pivoted links $b^2$ to said frame, so as to operate in connection with the stationary knife like parallel rulers, whereby in cutting the webbing the movable knife has a sliding or lateral as well as a downward movement. Further, the movable knife is slightly wider at one end than at the other, or somewhat of a tapering form in the direction of its length, as clearly shown in Fig. 14, whereby it has a shearing movement when operated to sever the webbing. An intermittent motion is imparted to the movable knife by means of an arm, $b^3$, provided with a pin, $b^4$, which engages with the cam-groove in the face of the wheel $b^5$, fixed on shaft $a^6$, as indicated in Figs. 1 and 5. An angular blade, $b^6$, is secured to the arm $b^3$, and is provided with a hooked portion, $b^7$, to partly encircle the shaft $a^6$, to give steadiness to said arm as it is reciprocated by the cam-wheel $b^5$. The webbing-feed shaft $a^6$, having the spur-pinion $a^5$ at one end, is provided at its opposite end with an eccentric, $c$, (see Fig. 2,) and on the band $c'$, which encircles the same, is formed an arm, $c^2$, having a ball-and-socket joint, to receive a finger, $c^4$, which is made fast to the paper-feed shaft $d$, and is capable of movement in the ball of the ball-and-socket joint, and, further, is provided with a spring-actuated pawl, $c^5$, enngaging the ratchet-wheel $d'$, (see Fig. 2,) fast on the shaft $d$, which is arranged in the frame A at right angles to the webbing-feed shaft $a^6$, said mechanism just described operating to convey an intermittent motion from the said webbing-feed shaft $a^6$ to said paper-feed shaft $d$. Several feed-rolls, $d^2$, are made fast to the shaft $d$, the peripheries of which move in slots made in the table 8, arranged at right angles to the table 1, so that the faces of said rolls are permitted to engage the faces of similar feed-rolls, $d^3$, fixed on a shaft, having its bearing in the frame A beneath the table 8, the lower feed-rolls, $d^3$, receiving motion from the upper feed-rolls by frictional contact. One end of the web of paper on the roll 9 is placed between the rolls $d^2$ $d^3$, whereby the paper is drawn from the roll 9 and fed to and beyond the paper cutting knives $e$ and onto the main table 1 below the webbing-tube 7, which is disposed slightly above said table, to permit the passage of the paper under it, the said tube containing a piece of webbing, as hereinbefore stated, which is of a proper length to form a boot-strap. The paper from the roll 9, of a width equal to the length of the central portion of the piece of webbing to be covered, is fed onto the main table 1 until its end is at the side of said table opposite the knives $e$, when the said knives, being of the same form, construction, and operation as the knives $b$, cut the paper into strips of a length equal to the width of the table 1, they thus being sufficient to envelop the webbing, and still have overlapping edges, which are pasted together in the manner to be presently described. The knives $e$ are secured to the frame A at a point between the said two tables, and an intermittent motion is imparted to the upper or movable knife by the arm $e'$, attached thereto, (see Figs. 12 and 13,) and having the finger $e^2$, engaging the cam-groove of the wheel $e^3$, secured to the webbing-feed shaft $a^6$. Just before or about simultaneously with the cutting of the strip of paper by the knives $e$, a film of paste is applied to the end of said strip farthest removed from the said knives by means of a paste-roll, $f$, having a raised portion or rib, $f'$, along its face and parallel with the axis thereof, the said roll having a combined rotary and reciprocating motion to press the rib $f'$ against the face of a gummed roll, $f^2$, working in a paste-box, $f^3$, the roll $f^2$ supplying the rib with a film or coating of paste, which in turn is transferred to the strip of paper by contact therewith on the return motion of the paste-roll $f$. A supplemental roll, $f^4$, arranged above and operating in connection with the gummed roll $f^2$, may be provided, if desired. The paste-roll $f$ has movable spring-actuated bearings in the upper ends of two rock-standards, $f^5$, whose lower ends are pivoted on a shaft, $f^6$, secured in the frame, (see Figs. 9 and 10,) and to the standard nearest the delivery end of the machine (see Fig. 10) is firmly attached one end of a short arm, $f^7$, whose opposite end works in the peripheral cam-groove of the wheel $g$, fast on the shaft $g'$. Thus, by the rotation of shaft $g'$ a reciprocating motion is given to the paste-roll $f$ through the rock-standards. At the same time a rotatory movement is imparted to said roll $f$ by means of the gear-pinion $g^2$, fixed on one end of the paste-roll, which engages the teeth of the rack-bar $g^3$, attached to table 1, (see Figs. 1 and 5,) whereby the rib $f'$ is alternately brought in contact with the gummed roll $f^2$ and the strip of paper on the table 1. The gummed roll $f^2$ is provided with a fixed pinion, $g^4$, and a loose tappet, $g^5$, (see Fig. 11,) the latter engaging the extended bearing $g^6$ of the paste-roll $f$, so that as said roll is moved to the gummed roll the extended bearing slides upon the curved upper surface of the tappet to depress the same, which thereby induces the pawl $g^7$, pivoted on the tappet and engaging the teeth of the ratchet $g^4$, to partially rotate the gummed roll, and as the paste-roll $f$ is moved from the gummed roll $f^2$ the spring $g^8$ (see Fig. 10) forces the tappet upward to hold it against the extended bearing $g^6$, and to keep the pawl in engagement with the teeth of the ratchet $g^4$. A piece of webbing of the proper length having been fed into the web-tube 7 and severed by the knives $b$, and a strip of paper to form the covering for the central portion of the piece of webbing having been fed into the table 1 below the tube 7 and severed and gummed, as described, both paper and webbing are then carried into the folder $k$ by portions of the mutilated roll $h$, fixed on shaft $h'$, and entering a slot, $7^b$, in the tongue $7^a$ of the tube, and by the belt $h^3$, (see Fig. 3,) running over pulleys $h^4$ $h^5$, secured, respectively, to shaft $g'$, heretofore mentioned, and shaft $h^6$. The shaft $h'$ receives its motion from gear $a^4$, which engages gear $h^2$. The belt $h^3$ enters a slot in the table 1, to thus come in contact with the paper lying thereon, and thence passes on the upper side of said table through the folder $k$, (see Fig. 3,) and then through another slot near the delivery end of the machine and onto the pulley $h^5$, as shown. Motion is communicated to shaft $g'$ and $h^6$ from gear $h^2$, fixed on shaft $h'$, through the idle-gear $i$, pinion $i'$ (see Fig. 4) on one end of shaft $i^3$, and the pinion $i^2$, (see Fig. 3,) secured to said shaft $i^2$ in the body of the machine, and gears $i^4$ $i^5$, respectively made fast to said shafts $g'$ and $h^6$, as shown in dotted lines, Fig. 3. Immediately above pulley $h^5$ is a partial-faced roll, $m$, fixed to shaft 10, and receiving motion from the idle-gear $i$ through gear 11, made fast to said shaft 10. As in the operation of the machine the mutilated roll $h$ enters the slotted tongue $7^a$, the piece of webbing and the strip of paper having a film of paste along one side are caught between the full-faced portion of the mutilated roll and the belt $h^3$, which then feed said webbing and paper, the former on top of the latter, into the folder $k$, which being of a tapering form, with flaring mouth and upturned inwardly projecting or folding sides, with one of said sides higher than the other, (see Fig. 7,) the strip of paper is caused to be folded over the top of the webbing with the pasted side overlapping but not touching the other side of the paper, the side having the paste being, in fact, carried above and the other side below the lower inwardly-projecting side, $k'$, of the folder, the cause of which will be obvious from an inspection of Figs. 6 and 7. The tongue $7^a$ of the webbing-tube 7 projects through the folder, to prevent the edges of the piece of webbing from curling by reason of the paper covering being folded over said webbing too closely. As the paper is being folded about the central portion of the webbing, which is to form the loop of the boot-strap when applied to the boot, the forward or uncovered end of said webbing will be passed by the belt $h^3$ to the rotating press-roll $m$, which, pressing the webbing against the belt $h^3$, will draw said webbing between the parts until that portion having the paper covering is reached, when the pressure on the covered webbing between the roll $m$ and belt $h^3$ will cause the overlapping ends of said paper covering to be fully pasted together. From the partial roll $m$ the piece of webbing is fed along the table 1 to and over two rolls, $n$ $n'$, (see Fig. 3,) rotating toward each other, until the middle of the covered portion is above the space or junction of the two rolls, when the folding-blade of the plunger $o$, which has a vertical reciprocating motion, forces the covered webbing or completed boot-strap between said rolls, and it is then delivered from the machine. The roll $n$ is provided with disks $n^4$ on either side thereof, to retain the webbing on said roll between the disks, as will be readily understood. Motion is conveyed to the rolls $n$ $n'$ from gear $i^5$ on shaft $h^6$, through the idle-pinion $n^2$ to the gear on shaft of roll $n$, which in turn meshes with a similar gear on shaft of roll $n'$, as clearly illustrated in Figs. 1 and 3. To attain the reciprocating motion of the plunger $o$, its end opposite to that carrying the folding-blade is pivoted in the bracket $o'$, Fig. 9, and is intermediately connected with the band of the eccentric $o^2$, fastened on the shaft 10, as shown in Figs. 1 and 9. Motion is given to the shaft $p$, secured in bearings $p'$ beneath the bed B, and carrying the paper roll 9 by means of a belt, $p^2$, running over a pulley, $q$, on the webbing-feed shaft $a^6$, (see Figs. 1 and 5,) and over a pulley, $q'$, on the shaft Q, arranged in bearings secured to the leg $b^6$ of the bed B at right angles to shaft $p$, said shaft Q carrying a friction-wheel, $r$, adapted to slide on the feather $r'$, and being in frictional contact with the disk $v^2$ on the contiguous end of the shaft $p$, to rotate the said shaft, as stated, and as shown in Fig. 15. As the roll of paper is decreased in bulk in the operation of the machine, the speed of the shaft $p$, carrying the paper roll 9, is correspondingly and automatically increased, to provide a regular feed of the paper to the machine by means of a press-wheel, $s$, journaled in the lower end of the arm $s^a$, which is secured at its other end to the shaft $s'$, mounted in bearings $s^2$, fixed to the under side of the bed B, the said shaft $s'$ having a lever, $t$, engaged by a spring, $u$, fastened to the bed B, which spring-actuated lever $t$ tends to turn its shaft $s'$ to keep the wheel $s$ constantly pressed against the periphery of the roll of paper, whereby as the diameter of said roll becomes lessened the shaft $s'$ is partially rotated in its bearings by the spring-actuated lever, to cause one of the fingers $v$, secured to said shaft $s'$ and engaging the friction-wheel $r$, to move it on the feathered shaft Q toward the center of the disk $r^2$, and thus increase the speed of the roll-shaft $p$. A coiled spring, $w$, encircles the shaft $p$ between its disk $r^2$ and the contiguous bearing $p'$, to insure the requisite frictional contact between the said disk and the wheel $r$, as will be readily understood. The importance of this provision for an even regular feed of the paper will be seen when it is remembered that the paper is intermittently fed to the table by the feed-rolls $d^2$, and it is therefore essential that the paper should be delivered to the rolls as fast as required; otherwise it would tear if the weight of the roll of paper or the slower delivery-speed of the paper-roll shaft had to be contended with.

I claim—

1. In a machine for covering webbing, the following instrumentalities: feeding mechanism for the ribbon of paper and the webbing, mechanism for cutting the webbing into suitable lengths, mechanism for cutting the paper into strips of less length than the webbing, mechanism for applying paste to one edge of the strip of paper, a folder to fold the strip of paper about the central portion of the piece of webbing, and a plunger to double or fold the length of webbing and its partial covering of paper, substantially as set forth.

2. In a machine for covering webbing, the following instrumentalities: feeding mechanism for the webbing, a tube to receive a length of webbing, mechanism for cutting the length of webbing from the roll, mechanism for feeding the paper, a table arranged below the webbing-tube to receive the end of the paper, pasting mechanism for applying a film of paste to the end of the paper, mechanism for cutting the strip of paper on the table from its roll, mechanism for removing the webbing and strip of paper from the tube and table, a folder to fold the strip of paper about the central portion of the piece of webbing, which is of greater length than the said strip of paper, and a plunger to double or transversely fold the covered webbing, substantially as set forth.

3. In a machine for covering webbing for boot-straps, the web-cutting knives, consisting, essentially, of a lower fixed knife and an upper or movable knife having a greater width at one end than the other, as described, and supported above the lower knife by links, substantially as set forth.

4. The lower knife $b$, the upper knife $b$, and the links $b^2$, combined with a vertical arm secured to the upper knife, and provided with a pin, and a rotating shaft provided with a wheel having a cam-groove in its periphery and adapted to operate the movable knife, as specified.

5. The combination, with a table and mechanism, substantially as described, for feeding a strip of paper thereon, of a tube arranged above the table sufficiently to readily permit the passage of the strip of paper between it and said table, and mechanism for feeding a piece of webbing into the said tube, substantially as set forth.

6. The combination, with a table and mechanism for feeding a strip of paper thereon, and cutters to sever said strip from its roll, and with a folder for folding said strip of paper into tube form when passed therein, of a tube arrang'd above the table sufficiently to readily permit the passage of the strip of paper between it and said table, the said tube provided with a tongue projecting into the folder, and mechanism for feeding a piece of webbing into the tube, substantially as set forth.

7. A table to receive a strip of paper, a tube arranged above the table, as specified, and adapted to receive a piece of webbing, combined with a folder adapted to lap or fold the paper about the webbing with lapping edges, a forwarding-roll, and a carrier-belt, the latter passing through the folder, substantially as set forth.

8. A table to receive a strip of paper, and gummed roll running in a paste-box arranged in connection with the table, the paste-roll $f$, provided with the rib, and having an oscillating and rotating motion to alternately bring the rib in contact with the gummed roll and one edge of a strip of paper on said table, and mechanism to operate, substantially as set forth.

9. The combination, with the paper-roll shaft provided with the reel and the disk, and the counter-shaft Q, having a feather-key and wheel, $r$, of the rock-shaft $s'$, provided with the arm having the wheel $s$, engaging the periphery of the roll of paper on the reel, the spring-actuated lever, and the finger $v$, engaging the wheel $r$, substantially as and for the purpose set forth.

10. A table to receive a strip of paper, a paste-roll to apply paste to one edge of said strip, a folder to fold the strip into tube form with the pasted edge above and out of contact with the opposite edge of the paper, combined with a tube adapted to receive a piece of webbing, and provided with a slotted tongue projecting into the folder, a carrier-belt passing through the folder, a forwarding-roll arranged in front of the folder and passing through the slotted tongue of the tube, to permit it to bind the paper and webbing to the belt, and a press-roll arranged back of the folder, to firmly paste the lapped edges of the paper covering to each other, substantially as described.

11. The combination, with the carrier-belt $h^3$, the press-roll $m$, and the oppositely-revolving rolls $n$ $n'$, of the reciprocating plunger, pivoted in bracket $o'$, and connected with the band of the cam-wheel $o^2$, secured to a rotating shaft, 10, substantially as described, and for the purpose set forth.

12. Feeding-rollers to feed a strip of webbing, an elevated table to receive the webbing, and cutters to sever the webbing, combined with feeding-rollers to feed a strip of paper across or at right angles to the webbing, and with the cutters to sever the said paper transversely, substantially as described.

13. Feeding-rollers to feed a strip of webbing, the cutters to cut the webbing in short lengths, feeding-rollers to feed a strip of paper across or at right angles to the piece of webbing, and the cutters to sever the strip of paper, combined with a folding-guide, and with mechanism, substantially as described, to feed the combined webbing and paper through the folding-guide.

14. Feeding-rollers to feed a strip of webbing, the cutters to cut the webbing in short lengths, feeding-rollers to feed a strip of paper across or at right angles to the piece of webbing, and the cutters to sever the strip of paper, and the paste-applying device to apply paste along one edge of the piece of paper, combined with a folding-guide, and with mechanism, substantially as described, to feed the combined webbing and paper through the folding-guide.

15. In a machine for covering boot-straps, the shears $e$, composed of a stationary blade and a movable blade parallel therewith, the movable blade being pivoted at each end upon a link, whereby it may be moved longitudinally to enable the shears to sever the material, substantially as described.

In testimony whereof I have signed my name to this specification in the presence of two subscribing witnesses.

GEO. F. NEWELL.

Witnesses:
G. W. GREGORY,
B. J. NOYES.